US012475659B1

(12) United States Patent
Morgan et al.

(10) Patent No.: US 12,475,659 B1
(45) Date of Patent: Nov. 18, 2025

(54) XR PLATFORM, SYSTEM AND METHOD

(71) Applicant: Wellovate, LLC, Boone, NC (US)

(72) Inventors: Joseph W. Morgan, Blowing Rock, NC (US); Allen Ronald Rufolo, Mint Hill, NC (US); Rahul A. Patel, Huntersville, NC (US)

(73) Assignee: Wellovate, LLC, Boone, NC (US)

( * ) Notice: Subject to any disclaimer, the term of this patent is extended or adjusted under 35 U.S.C. 154(b) by 233 days.

(21) Appl. No.: 18/208,661

(22) Filed: Jun. 12, 2023

Related U.S. Application Data

(63) Continuation-in-part of application No. 18/127,332, filed on Mar. 28, 2023, now Pat. No. 11,961,197, and a continuation of application No. 17/552,067, filed on Dec. 15, 2021, now Pat. No. 11,615,600, which is a continuation of application No. 17/175,033, filed on Feb. 12, 2021, now Pat. No. 11,217,033, which is a continuation of application No. 16/773,432, filed on Jan. 27, 2020, now Pat. No. 10,943,407.

(60) Provisional application No. 63/351,040, filed on Jun. 10, 2022, provisional application No. 62/801,914, filed on Feb. 6, 2019, provisional application No. 62/796,909, filed on Jan. 25, 2019.

(51) Int. Cl.
*G06T 19/00* (2011.01)
*G16H 15/00* (2018.01)

(52) U.S. Cl.
CPC .......... *G06T 19/006* (2013.01); *G16H 15/00* (2018.01)

(58) Field of Classification Search
CPC ............... G06T 19/006; G16H 15/00
See application file for complete search history.

(56) References Cited

U.S. PATENT DOCUMENTS

| | | | |
|---|---|---|---|
| 5,591,409 | A | 1/1997 | Watkins |
| 6,149,586 | A | 11/2000 | Elkind |
| 6,425,764 | B1 | 7/2002 | Lamson |
| 8,630,867 | B2 | 1/2014 | Yoo |
| 9,390,630 | B2 | 7/2016 | Daniels |
| 9,814,423 | B2 | 11/2017 | Jain et al. |
| 10,943,407 | B1 | 3/2021 | Morgan |
| 11,217,033 | B1 | 1/2022 | Morgan et al. |
| 11,615,600 | B1 | 3/2023 | Morgan et al. |
| 2002/0146672 | A1 | 10/2002 | Burdea et al. |
| 2005/0216243 | A1 | 9/2005 | Graham et al. |

(Continued)

FOREIGN PATENT DOCUMENTS

| | | |
|---|---|---|
| CN | 106599558 | 4/2017 |
| EP | 2873444 | 5/2015 |

(Continued)

OTHER PUBLICATIONS

U.S. Appl. No. 18/127,332, filed Mar. 28, 2023.

*Primary Examiner* — Jeffery A Brier
(74) *Attorney, Agent, or Firm* — Schwartz Law Firm, P.C.

(57) ABSTRACT

A computer-implemented XR platform is configured for teaching, training, instructing, diagnostic, therapeutic and/or care delivery. The XR platform includes a plurality of software modules. A combined extended reality display and computing device is adapted for implementing one or more of the plurality of modules. A classifier system automatically identifies, classifies, and documents data comprising criteria adapted to fulfill a requirement for at least one code relating to health or wellness.

1 Claim, 4 Drawing Sheets

(56) References Cited

U.S. PATENT DOCUMENTS

| | | | |
|---|---|---|---|
| 2006/0020493 A1* | 1/2006 | Cousineau | G10L 15/1822 |
| | | | 705/2 |
| 2007/0006889 A1 | 1/2007 | Kobal | |
| 2012/0108909 A1 | 5/2012 | Slobounov et al. | |
| 2014/0147820 A1 | 5/2014 | Snow et al. | |
| 2014/0287389 A1 | 9/2014 | Kallmann et al. | |
| 2015/0133820 A1 | 5/2015 | Zohar | |
| 2015/0310758 A1 | 10/2015 | Daddona et al. | |
| 2015/0312533 A1* | 10/2015 | Moharir | G16H 80/00 |
| | | | 348/14.02 |
| 2016/0247017 A1 | 8/2016 | Sareen | |
| 2017/0150897 A1 | 6/2017 | Komaki | |
| 2017/0323485 A1 | 11/2017 | Samec et al. | |
| 2018/0071425 A1 | 3/2018 | Jin et al. | |
| 2018/0190376 A1 | 7/2018 | Hill et al. | |
| 2018/0263535 A1 | 9/2018 | Cramer | |
| 2019/0176034 A1 | 6/2019 | Flego | |
| 2019/0196576 A1 | 6/2019 | Saarinen | |
| 2020/0077939 A1 | 3/2020 | Richer et al. | |
| 2020/0342966 A1* | 10/2020 | Stern | G06Q 30/04 |
| 2021/0366608 A1* | 11/2021 | Podobas | G16H 15/00 |
| 2022/0369000 A1* | 11/2022 | Bouazizi | H04S 7/302 |
| 2022/0375556 A1* | 11/2022 | Ghauri | G16H 10/60 |
| 2024/0177244 A1* | 5/2024 | Yu | G06Q 40/12 |

FOREIGN PATENT DOCUMENTS

| | | |
|---|---|---|
| WO | WO2008131294 | 10/2008 |
| WO | WO2013054257 | 4/2013 |
| WO | WO2014124002 | 8/2014 |
| WO | WO2015134953 | 9/2015 |
| WO | WO2017115366 | 7/2017 |
| WO | WO2017174466 | 10/2017 |

* cited by examiner

XR PLATFORM, SYSTEM AND METHOD

TECHNICAL FIELD AND BACKGROUND OF THE DISCLOSURE

The present disclosure relates broadly and generally to an extended reality platform, system and method—referred to broadly and collectively herein as "XR platform" or "platform" or the like. The exemplary XR platform of the present disclosure is configured for teaching, training, instructing, diagnostic, therapeutic, care delivery and other such uses. Exemplary embodiments, implementations, modules and features of the present XR platform are disclosed in Applicant's prior issued U.S. Pat. No. 10,943,407 entitled "XR HEALTH PLATFORM, SYSTEM AND METHOD". The complete disclosure of this prior patent is incorporated herein by reference.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Any reference herein to "patient", "user", "clinician", and any other individual is intended as gender neutral notwithstanding use of the words "he", "him", "himself" or the like, or any singular possessive use of the word "his" or the like.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

According to one exemplary embodiment, the present disclosure comprises an extended reality (XR) platform, system and method.

ABBREVIATIONS AND DEFINITIONS

All claim terms used herein are intended to be given their broadest reasonable meaning in their ordinary usage as these terms would be understood by one of ordinary skill in the art, and consistent with their ordinary and customary meaning in the art while taking into account the following definitions and written description contained in the present specification.

"ID" refers to an identification and/or identifier.
"GUID" means a globally unique identifier.
"UI" means user interface.
"2D" means two-dimensional.
"3D" means three-dimensional.
"API" means Application Programmer Interface.

"Extended Reality (XR)" refers to any real-world-and-virtual combined environment and human-machine interactions generated by technology, including any two-dimensional (2D) and/or three-dimensional (3D) content and/or features. XR includes virtual reality (VR), augmented reality (AR), mixed reality (MR), 2D content (including through the use of a computer monitor, television, and/or any other 2D viewing device), 3D content, the use of platform features, and/or any use of the XR platform. For clarity, XR also includes any platform features, scenes, sessions, regimens, content and/or features which may be simulated, accessed, viewed, and/or interacted with through the use of XR devices, web portals, and/or companion applications. Within this disclosure, the terms "augmented reality" and "virtual reality" are synonymous.

"XR device" refers to any device that can be used for simulating, viewing, engaging, experiencing, controlling and/or interacting with XR. This includes headsets, head-mounted displays (HMD), augmented reality glasses, 2D displays viewing XR content, 2D displays, 3D displays, computers, controllers, projectors, other interaction devices, mobile phones, speakers, microphones, cameras, headphones, haptic devices, and the like.

"Clinician application" refers to one embodiment of the companion application described herein. Where mentioned, "clinician application" describes a clinician-facing portion of the system used to control, observe, monitor, and/or interact with instances of the patient-facing portion(s) of the XR platform. The clinician application may run on XR devices.

"HMD" means head-mounted display.

"Supervised" means requiring the input of and/or evaluation by humans.

"Semi-supervised" (herein synonymous with "semi-autonomous") means may or may not require the input of and/or evaluation by humans.

"Unsupervised" (herein synonymous with "autonomous") means not requiring human input and/or evaluation. Use of the term "unsupervised" includes its use in the context of ML/AI models, where it may additionally refer to the use of these models to identify and/or characterize signals, patterns, and/or results from sets of data without requiring human input.

"Scene" refers to a single XR environment with objects, content and/or features.

"Session" refers to one continuous usage period of XR, one continuous usage of a web portal, and/or one continuous usage of a companion application.

"Scene data" refers to all measurable and/or available data from scenes.

"Session data" refers to all measurable and/or available data from sessions.

"Session categories" refers broadly herein to functional, disease related, organ system related, individual related, population related, or any other meaningful labels or classifications relating to health or wellness that are used for categorizing or organizing the scenes within a session.

"Platform" refers to the entire software and hardware ecosystem described herein.

"Platform data" refers to any and/or all data within the entire software ecosystem described herein. May be generated and/or modified manually (e.g., by instructors, teachers, users, clinicians, clinical providers, caregivers, patients, administrators), in an autonomous/unsupervised fashion (e.g. by ML model and/or programmatically), and/or in a semi-autonomous/semi-supervised fashion (a combination of automatic and manual generation and/or modification).

"Platform data point(s)" (herein synonymous with "point(s) of platform data") refers to item(s) of platform data.

"Platform data field" refers to the "empty box" occupied by platform data of a speciated type.

"Criteria Group(s)" refers to a category, label, tag, organizational scheme or classification for one or more points of platform data or platform features representing or relating to one or more meaningful criteria within healthcare.

"Derived data" refers to any new and/or novel platform data and/or data fields created by combining sets of platform data fields and/or by applying machine learning, artificial intelligence, mathematical, and/or logical operations on platform data.

"Platform action(s)" and "platform feature(s)" refer to measurable and/or configurable actions or capabilities of the XR platform.

"User" may include patient, instructor, student, provider, employee, or other person.

"User platform actions" refers to actions and/or interactions between a user using the XR platform and objects, content items, platform features, scenes, and/or instructors or clinicians.

"User behaviors" refers to measurable user actions tracked over time.

"Clinician" refers to any individual licensed and/or authorized by a regulatory body and/or authorized by patients or users to perform and/or carry out appropriate items described herein. This definition of clinician may include any of the following: a physician, nurse, therapist, clinical provider, provider, advanced practice nurse, physician assistant, dentist, chiropractor, caregiver, allied health professional, family member, instructor, trainer, teacher friend, loved one, and/or technologist.

"Care delivery" (herein synonymous with "care" unless otherwise specified) refers to the application and/or utilization of platform features in patients.

"JSON" means JavaScript Object Notation.

"Camera" refers to a real-world or virtual object that may produce images, renderings, and/or videos.

"Tag" (herein synonymous with "tagging", "label(s)", and/or "annotation(s)") refers to a tag, label, and/or annotation applied to features and/or content, platform features, and/or any other item(s) within the XR platform as described herein.

"HIPPA" means of and/or relating to the Health Insurance Portability and Accountability Act of 1996.

"Snippet" (herein synonymous with "content object") refers to a single continuous piece and/or item of text, audio, image, video, rendered object, and/or other forms of media and/or content. A snippet may include an instructional, educational, feedback, and/or therapeutic statement, and/or a diagnostic, rhetorical, and/or thought-provoking question. A snippet may also be an input and/or output for ML/AI models.

"Virtual human avatar" refers to a humanoid virtual avatar which may be animated, simulated, programmatically controlled (using ML/AI models, for example), and/or represented through other types of rendered content and/or other media, and is designed to interact with, educate, instruct, demonstrate, advise, assist, guide, escort, diagnose, screen, test, treat, and/or manage disease(s) and/or health-related issues for users in XR. Virtual human avatars may interact with users and/or clinicians through spoken dialogue, text, rendered content, through visual means, and/or through any other method of communication. Virtual human avatars may possess characteristics that are virtual approximations and/or facsimiles of characteristics of real-world clinicians and/or users. When used in this context, the term "virtual human avatar(s)" is synonymous with "digital twin(s)".

"Portion of virtual human avatar" refers to one continuous area on a virtual human avatar.

"Disease" (herein synonymous with "diseases") refers to any disease and/or illness and/or disorder and/or syndrome and/or ailment and/or sickness and/or condition and/or disability and/or health-related issue.

"ML/AI model" (also ML/AI) includes any models, functions, algorithms, code, and/or programming that involve machine learning, artificial intelligence, mathematical, statistical, logic-based processes, and/or control functionalities. Some examples include any model and/or algorithm that includes and/or is related to the following: arithmetic, calculus, matrices, linear algebra, differential equations, discrete math, logic, regression, decision forests, neural networks, recurrent neural networks, convolutional neural networks, adversarial learning, generative adversarial networks, capsule networks, reinforcement learning, transfer learning, computer vision (CV), object identification, object recognition, activity recognition, key point detection, pose recognition, spatial recognition, spatial contextualization, spatial understanding, optical character recognition (OCR), object segmentation, mask segmentation, instance segmentation, text-based (sentiment, content, feature extraction, etc.), natural language processing, natural language understanding, text to speech (may also be referred to as "text-to-speech" or "TTS"), speech to text (may also be referred to as "speech-to-text" or "STT"), and/or collaborative filtering.

"Q&A" refers to one or more elements of the question and answer feature as described herein.

"Interaction" (herein synonymous with "interactions") refers to any interaction occurring between a user and any feature, item, or element within the XR platform, and/or any interaction occurring between a user and a clinician. An interaction may be spoken, audio-based, text-based, visually-based, tactile-based, and/or movement-based. For clarity, any encounter, scene, session, and/or regimen involving a user is a type of interaction.

"Safety prompt" refers to a visual, auditory, and/or text-based message that delivers safety-related instructions, safety-related educational points, and/or evokes safety-related actions (for example, an audio message "please remove the HMD").

"User input methods" (herein synonymous with "user input(s)") refers to user interactions with platform features which may be accomplished using one or more of the following: controller inputs (which includes controller buttons, joysticks, and/or touch sensors, and/or any other controller functionalities), keyboard inputs, computer mouse inputs, touchscreen inputs, physical movements, spoken voice/verbal inputs, gaze inputs, text inputs, question response inputs, communication inputs, and/or by any other visual, tactile, movement-based, and/or auditory means, and/or by any other means described herein.

"Positional tracking" includes two-dimensional positional tracking data, three-dimensional positional tracking data, two-dimensional rotational tracking data, and/or three-dimensional rotational tracking data. Positional tracking may also include points of data obtained through the use of items of XR hardware, cameras, microphones, and/or any other type of sensor, either with or without the use of ML/AI models.

"Game engine" refers to any third-party software used to create XR content and/or XR applications.

"Metadata" refers to data that describes and/or relates to points of platform data.

"Platform feature(s)" refers to any one or more of the features and/or items described herein. For clarity, the definition of "platform feature(s)" includes any feature described herein as well as any item(s) within and/or related to any feature described herein.

"Content and/or feature(s)" (synonymous with "content", "feature(s)", and/or "XR program" unless otherwise specified) refers to any object, lighting condition, audio element, video element, animation element, rendered element, sensing element, programmatic functionality, software, programming, code, user interface, user experience, menu, text element, any element within XR, any element interacted with using XR, other platform features, and/or other items relating to XR. For clarity, this includes the use of XR devices to view, experience, engage in and/or interact with any item described herein.

"XR hardware data" includes points of data produced by, and/or delivered to, any device with XR functionalities.

"Eye tracking data" includes positional eye tracking data, gaze tracking data, retinal data, data relating to images of the eye, and/or pupil data obtained from one or both eyes of individuals.

"Perioperative" (synonymous with "periprocedural", "procedural", "procedure", "operation", and/or "surgery" unless otherwise specified) refers to the period of time before, during, and after any medical procedure, surgical procedure, health-related procedure and/or surgery.

"Biometric data" refers to data points obtained from any wearable, medical, and/or health-related sensor, device, and/or item of hardware. For clarity, data obtained from ML/AI models may be considered biometric data (for example, when this data relates to health-related characteristics of an individual). Biometric data also includes any of electrocardiogram data (EKG); heart rate data; heart rate variability data (HRV), and/or any derivative of RR and/or NN interval; pulse wave velocity; laser doppler vibrometry data; ultrasound data; x-ray and/or other radiographic imaging data; electroencephalogram data (EEG); electromyography data (EMG); electrooculography data (EOG); galvanic skin response (GSR); impedance data; electrodermal data; accelerometry/IMU data (other than data from XR controllers or HMD); pupil diameter; blood pressure; respiratory rate; pulse oximetry; oxygen consumption; grip strength; blood glucose; points of anthropometric data including height, weight, waist circumference, bust circumference, thigh circumference, bicep circumference, body fat percentage; capnography including end-tidal CO2; lung volumes and/or lung capacities; data points relating to measurements of respiratory and/or pulmonary flow; data points relating to eye tracking; range of motion data for skeletal joints; data points produced by and/or derived from real-world or virtual cameras; points of activity data including active minutes, cadence, calories burned, distance, exercise minutes, floors and/or flights climbed, inactivity and/or sitting time, minutes of moderate-to-vigorous physical activity, peak acceleration, speed, step count; points of sleep data including number of awakenings per sleep session, number of restless periods, sleep duration, sleep latency, sleep position, time awake per restless period, length of time in bed, wake-up time, time out of bed.

The terms "Medical Value Capture Classification System" and "Coding System" may be used interchangeably herein.

"Codes" refers to billing codes, diagnosis codes, codes relating to quality, cost, care pathways, drugs, procedures, medical devices, lab tests, clinical assessments, group purchasing, telehealth, insurance or any other coding convention relating to healthcare or the business of healthcare. Some specific code schemas include CPT®, ICD-10, HCPCS, LIONC, DEA number, NPI number, FHIR "Provider" or "Providers" refers to any healthcare provider staff member administrator billing specialist insurance adjuster insurance agent scribe therapist nurse or any other person working for or on the behalf of any healthcare organization, or any business interacting with, or relating to the business of healthcare.

"Healthcare" refers to any service business entity or provider that provides a service relating to the care of patients, this may include but is not limited to hospitals, doctor's offices, post-acute facilities, senior living facilities, nursing homes, rehab facilities, drug treatment centers, dialysis centers, surgery centers, medical centers, healthcare systems, telehealth organizations, any health care practice and/or any other entity directly involved in healthcare activities.

"Business of healthcare" refers to any company, entity, or business activity that directly or indirectly relates to any entity within healthcare.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

Figure 1:
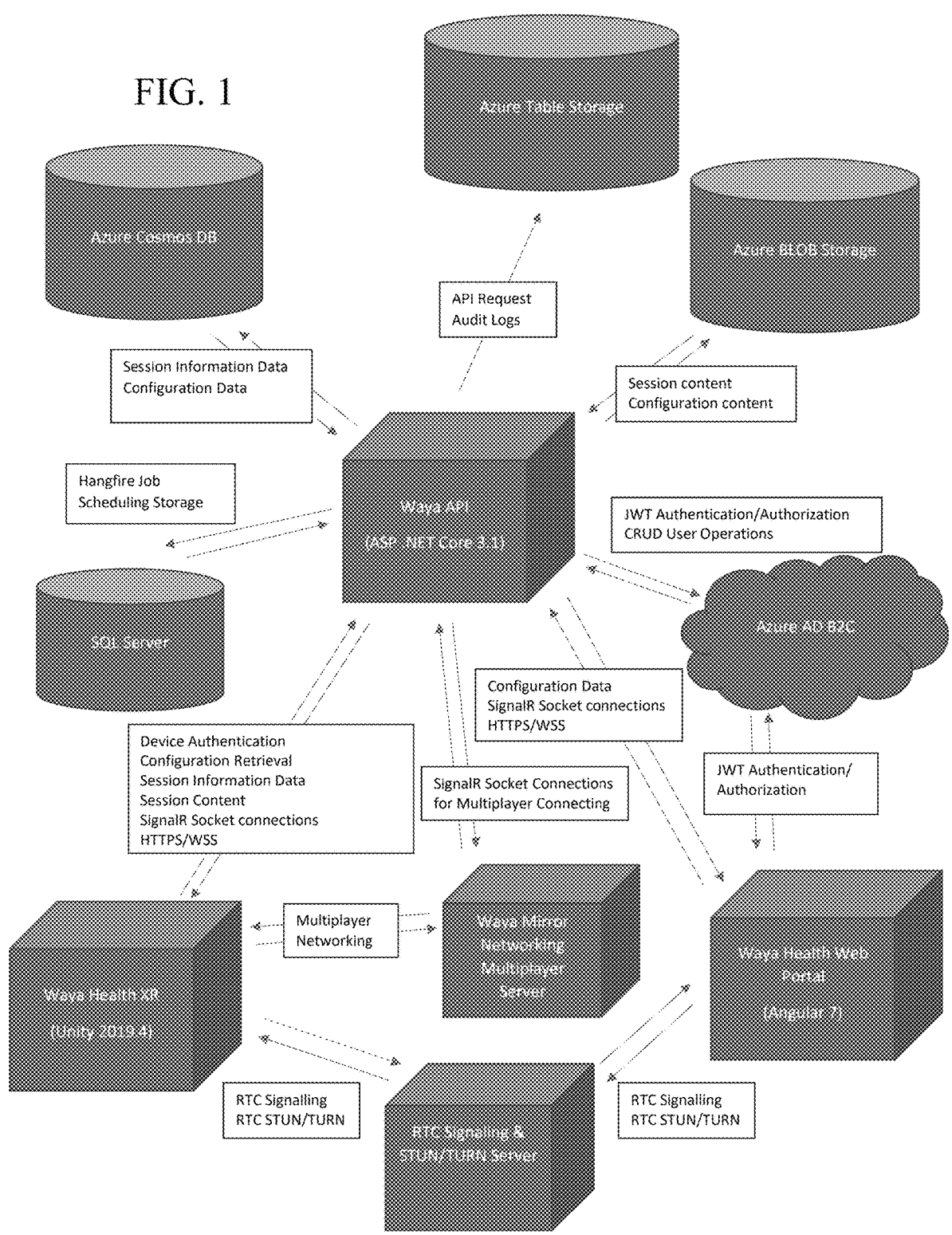
FIG. 1 is a diagram outlining high level architecture of the exemplary XR platform of the present disclosure.

The present invention is described more fully hereinafter with reference to certain exemplary embodiments. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, and any and all equivalents thereof.

Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

The present disclosure comprises an extended reality platform, system and method—also referred to broadly and collectively herein as "XR platform" or "platform" or the like.

The exemplary XR platform of the present disclosure may be implemented via a computer program product (e.g., software application or "mobile app") comprising program instructions tangibly stored on a computer-readable medium, and operable to cause a computing device to execute the present XR platform. The present disclosure further comprises a computer-readable storage medium storing computer-executable instructions, executable by processing logic of a computing device, including instructions, that when executed by the processing logic, cause the processing logic to perform the present XR platform. In yet another exemplary embodiment, the present disclosure comprises an article of manufacture including a computer-readable storage medium, and executable program instructions embodied in the storage medium that when executed by processing logic of a computing device causes the processing logic to perform the present XR platform. The computing device may incorporate or comprise any general or specific purpose machine with processing logic capable of manipulating data according to a set of program instructions. Examples of web browsers include standalone virtual reality devices, standalone augmented reality devices, standalone mixed reality devices, high-end mobile phones or "smartphones", tablet computers, laptops, personal computers, and others.

Exemplary Standalone Extended Reality (XR) Device

In one exemplary embodiment, the present XR platform utilizes a combined extended reality head-mounted display and computing device (referred to herein as "HMD and computing device"). The exemplary HMD and computing device comprises a standalone (meaning wireless and untethered) extended reality system using an operating system such as Google's Android, Apple's iOS, and others. The exemplary HMD and computing device may include a virtual reality head-mounted display, an augmented reality head-mounted display, or a mixed reality head-mounted display. The HMD and computing device may also include a web browser, high-speed data access via Wi-Fi and mobile broadband, Bluetooth capability, an expandable memory slot for micro SD cards, built-in eye tracking capabilities, front-facing and rear-facing cameras, video mirroring and video output support, built-in speaker and microphone, built-in rechargeable lithium-polymer battery, a USB-C or Micro USB port for connecting to a PC for debugging or file transfer, built-in stereo speakers, 3.5 mm headphone jack, advanced application programming interfaces (APIs) for running third-party applications, and various sensors including three-axis gyro, accelerometer, inertial measurement unit, ambient light sensor, and/or other sensors.

Exemplary Tethered Extended Reality (XR) Device

In one exemplary embodiment, the present XR platform utilizes a wearable head mounted display (referred to herein as "HMD"). The exemplary HMD comprises a wired unit that is connected to a PC that runs on the Windows 10 operating system, or another operating system. The exemplary HMD is powered and managed via the Windows Mixed Reality software (which employs the HMD with the ability to run Universal Windows Platform (UWP) applications), but may be powered and managed by other software packages. The HMD may include a high-resolution display screen. The HMD may further include built-in Bluetooth capability for pairing controllers directly to the HMD. If the HMD does not include Bluetooth, other software may by utilized to manage controller pairing through other means. The exemplary HMD may also include a web browser, high-speed data access . . . via Wi-Fi and mobile broadband, Bluetooth capability, built-in eye tracking capabilities, front-facing and rear-facing cameras, video mirroring and video output support, built-in speaker and microphone, built-in stereo speakers, 3.5 mm headphone jack, advanced application programming interfaces (APIs) for running third-party applications, and various sensors including three-axis gyro, . . . accelerometer, inertial measurement unit, infrared sensor, ambient light sensor, and/or other sensors.

Exemplary Two-Dimensional Display Device

In one exemplary embodiment, the present XR platform utilizes a two-dimensional display and computing device (referred to herein as "2D Device"). The exemplary 2D Device comprises a two-dimensional display and computer, tablet computer, and/or mobile computing device such as a mobile phone. The 2D Device may also include a web browser, high-speed data access via Wi-Fi and mobile broadband, Bluetooth capability, an expandable memory slot for micro SD cards, built-in eye tracking capabilities, cameras, video mirroring and video output support, built-in speaker and microphone, USB ports for connecting to other devices for debugging or file transfer, HDMI ports for connecting a two-dimensional display to a computer, built-in stereo speakers, 3.5 mm headphone jack, advanced application programming interfaces (APIs) for running third-party applications, and various sensors including three-axis gyro, accelerometer, inertial measurement unit, infrared sensor, ambient light sensor, and/or other sensors.

Exemplary Virtual Reality Device Tracking Mechanisms

The exemplary HMD, HMD and computing device, and/or 2D Device may also include different versions of positional tracking in the form of either orientation tracking (3 degrees of freedom) or Inside out tracking (6 degrees of freedom). Positional tracking may be achieved using cameras and/or sensors. The exemplary HMD and computing device, HMD, and/or 2D Device may include different versions of input in the form of either one controller (3 degrees of freedom), two controllers (6 degrees of freedom), hand tracking (controllerless and 6 degrees of freedom), and/or other method of input.

Exemplary Web Browser

In one exemplary embodiment, the web portal and/or companion application may be accessed through one of the following web browser versions: Chrome, Chromium, Firefox, Edge, Internet Explorer (IE), IE Mobile, Safari, IOS, Android, Nougat, Marshmallow, Lollipop, and KitKat.

Exemplary Computing Environment

In an exemplary implementation discussed further below, the present XR platform operates in an environment utilizing a client device, such as the HMD and computing device, the HMD, the 2D device, and/or the web browser described above, in communication with a host server (e.g., cloud server) over a computer network, such as the Internet. The exemplary computing environment utilizes and incorporates all necessary hardware components and software to support the various wireless or wired communication functions as part of a network communication system.

The host server communicates with the XR platform, the web portal and/or companion application, and any other involved systems including ML/AI models, and/or other third-party software libraries or applications. The host server Web API application exposes a finite list of API (Application Programming Interfaces) endpoints that utilize GET, POST, PUT, PATCH, DELETE, and any other HTTP Verbs to transfer data to/from the client application. The endpoints may also only be accessed once the user is properly authenticated with a third-party authentication system (e.g. OAuth2).

The host server communicates with the application's database (e.g. SQL, CosmosDB) via SQL commands, document queries (no SQL), and third-party system HTTP requests. The communication with the database includes a series of CRUD commands (Create, Read, Update, Delete) to modify the contents of the database.

In other embodiments, the present XR platform may utilize other computer networks; for example, a wide area network (WAN), local area network (LAN), or intranet. The host server may comprise a processor and a computer readable medium, such as random access memory (RAM). The processor is operable to execute certain programs for performing the present XR platform and other computer program instructions stored in memory. Such processor may comprise a microprocessor (or any other processor) and may also include, for example, a display device, internal and external data storage devices, cursor control devices, and/or any combination of these components, or any number of different components, peripherals, input and output devices, and other devices. Such processors may also communicate with other computer-readable media that store computer program instructions, such that when the stored instructions are executed by the processor, the processor performs the acts described further herein. Those skilled in the art will also recognize that the exemplary environments described herein are not intended to limit application of the present XR platform, and that alternative environments may be used without departing from the scope of the invention. Various problem-solving programs incorporated into the present XR platform and discussed further herein, may utilize as inputs, data from a data storage device or location. In one embodiment, the data storage device comprises an electronic database. In other embodiments, the data storage device may comprise an electronic file, disk, or other data storage medium. The data storage device may store features of the disclosure applicable for performing the present XR platform. The data storage device may also include other items useful to carry out the functions of the present XR platform. In one example, the exemplary computer programs may further comprise algorithms designed and configured to perform the present XR platform.

Exemplary XR Platform

The schematic diagram shown in FIG. 1 outlines the architecture of the present XR platform. The diagram includes the web application, the extended reality application, and the necessary cloud and back-end infrastructure to collect, store, and retrieve platform data, and to comprise as well as enable platform features.

In exemplary embodiments described herein, the present XR platform is a modular, scalable, and broadly capable teaching, training, diagnostic, therapeutic, and care delivery system. It empowers clinicians to create, develop, modify, automate and/or deploy teaching, training, diagnostic, therapeutic, care delivery solutions, and/or care delivery end-to-end workflows and/or a portion of teaching, training, diagnostic, therapeutic, care delivery solutions, and/or care delivery workflows relating to users. The exemplary XR platform leverages the motivational, experiential, and immersive properties of XR. Its modular framework allows for both individual solutions as well as complete care systems. ML/AI models, points of platform data, as well as information and communication technologies may be integrated to allow for personalized, tailored, iterative, actionable, and/or distributed care solutions.

Any of the content, methods, systems and/or platform features described herein are intended to be applied, accessed, viewed, and/or interacted with using subtypes of XR, either with or without accompanying audio, haptic, and/or other types of media. For example, an implementation to manage chronic low back pain may utilize virtual reality for pain distraction, augmented reality for decision support to identify objects that may be too heavy to pick up, mixed and extended reality for either the distraction or decision support, and/or a 2D application for instructed exercise to prevent worsening of pain.

Any of the exemplary platform features may be applied as any portion of applications relating to the teaching, instruction, health, wellness, and/or health education of individuals. Additionally, any of the platform features may be combined with any other set of platform features to form applications of the exemplary XR platform. Additionally, any set of items (any item within any module, feature, or sub-feature) may be combined with any other set of items for any implementation(s) of the XR platform.

In one exemplary implementation, the present XR platform may be employed by multiple types of users: instructors, students, patients, clinicians (also referred to as "caregivers"), and administrators (also referred to as "admins" or "administrators") and others. The term "user" or "users" may mean instructor(s), trainer(s), teacher(s), student(s), admin(s), patient(s), and/or clinician(s). Admins are a user class with all of the access and/or privileges of clinicians and/or patients, and in addition, admins also have access to otherwise restricted areas, features, and/or functionalities.

Any mentioning of "configure", "configured", "pre-configured", "pre-configure", and/or "configuration" refers to the utilization of functionalities and/or features described further herein (unless explicitly stated otherwise).

Platform features may exist within HIPPA compliant systems.

All items described herein as well as any combination of items described herein are intended to be utilized in any health-related and/or wellness-related setting including, for example: inpatient care settings, outpatient care settings, home care settings, telehealth and/or remote care settings, post-acute care settings, skilled nursing care settings, nursing home settings, rehabilitation settings, pre-operative care settings, intraoperative care settings, post-operative care settings, palliative care . . . settings, any medical practice setting, any residential setting, dentistry, orthodontic, optometry, chiropractic, and/or podiatry settings.

The exemplary XR platform includes features which are organized into different "modules" Several of these modules are described further below. Other such modules are described in Applicant's issued U.S. Pat. No. 10,943,407—the complete disclosure of which is incorporated herein by reference. The exemplary modules are for organizational purposes only, and any set of features and/or any set of items within features may be combined with any set of other features and/or items described herein, irrespective of module(s). Each of the exemplary modules may comprise features applicable for creating, configuring, and/or deploying tailored, personalized, adaptive and/or problem-focused scenes, sessions, and/or regimens to deliver, perform, and/or deploy teaching features, training features, diagnostic tests, screening tests, therapeutic features, and/or care delivery features. These features enable clinicians or instructors and/or ML/AI models to create, modify, configure, administer, and/or orchestrate diagnostic, therapeutic, care delivery, teaching and/or training solutions in XR.

ML/AI models may be used to create, control, identify, assess, deploy, instantiate, deliver, configure, modify, interact with, and/or remove points of platform data and/or platform features. ML/AI models may have multiple purposes and/or uses within the XR platform-including that listed below.

Some examples of the ML/AI Model uses within the present XR platform comprise:

(a) Virtual human avatars or virtual avatars controlled by ML/AI models (such as generative adversarial networks, reinforcement learning, decision forests, and the like) to interact with and/or influence the actions of users in XR.

(b) Collaborative filtering to determine preferences.

(c) Natural language processing and/or natural language understanding to assess user and/or provider sentiment, symptoms, history of present illness items, emotions and/or feelings expressed by a user.

(d) Natural language processing and/or natural language understanding to utilize and/or apply corpora of medical specific terminology in diagnosis, treatment, and/or care delivery.

(e) Natural language processing and/or natural language understanding to determine and/or identify user and/or provider sentiment, symptoms, history of present illness, emotions and/or feelings expressed by a user.

(f) Computer vision models to identify facial and/or any anatomic topologic features for the diagnosis of disease.

(g) Computer vision models to characterize and/or measure wounds and/or skin lesions.

(h) Computer vision models to determine positional data given the data from cameras.

(i) Computer vision models as an overlay on top of or more medical images.

(j) Computer vision instance segmentation masks to determine anthropometric features.

(k) Computer vision models for facial tracking and facial expression analysis.

(l) Approaches to identify vocal biomarkers from text and/or audio.

(m) Activity recognition computer vision models to identify healthy and/or unhealthy actions and/or behaviors.

(n) Language models including, but not limited to large language models (with or without the application of reinforcement learning techniques to train or fine tune the models), conversational models, question-answering models, text classification models, token classification models, . . . zero-shot classification models, text generation models, fill-mask models, sentence similarity models, text summarization models, translation models, and/or other natural language models.

(o) Multimodal models incorporating two or more of the above types of models.

In one exemplary embodiment, the present disclosure comprises one or more configurable extended reality delivery and customization features that enable and/or enhance simulation, therapeutic, diagnostic, teaching, training, assessment-type and/or rehabilitation-type experiences for individuals or groups with automated collection of data. In this embodiment, user input methods can include controllers, voice, the user's bare hands, or any other patient input methods.

This embodiment includes an integrated question and answer system allowing providers, instructors, or users to rapidly construct assessments using a variety of different question types (including multiple choice, single response, multiple response, true/false, etc.) for users to answer while in extended reality or using a web application. This question-and-answer system may additionally allow providers to configure questions or assessments to occur before and/or after any other experience or session. All responses to questions are automatically collected, scored, and tabulated, and users or instructors can view tabulated results and related visualizations for individuals, cohorts, or populations using an integrated browser-based web application. Instructors are able to implement granular control over which questionnaires are administered at which points during the user experience (e.g., before and/or after any scene, before and/or after any session). Questions may be displayed in text and/or read aloud to the user, and the user may select answer choices using a controller, their gaze, or using their own voice. All responses to questions are automatically collected, scored, and tabulated, and users or instructors can view results using our integrated web application with a very high level of control and granularity. The ability to rapidly create custom questions and assessments, deploy them to individual users or groups within extended reality, and then automatically collect and tabulate results allows to rapidly implement pilot testing and evaluation efforts to determine the utility and/or feasibility of any particular effort. This embodiment may include the automated collection, visualization, and evaluation of patient or user results and outcomes produced by simulations or experiences.

The XR platform may include an immersive learning tool to dynamically train personnel in the identification of do's and don'ts and the ability to gauge harmful behavior in simulation-based training scenarios. The tool dynamically identifies the do's and don'ts as they occur within any related training simulation, and can be applied to any related simulation scenario or experience to provide the user with real-time feedback.

The XR platform may work online or offline.

The XR platform may utilize one or more approaches to train or educate individuals with regards to health or on how to properly utilize the XR platform. In one exemplary embodiment, this may include digital media, immersive experience based supportive materials including safety, usage, and setup guides, answers to FAQs, user handouts, video tutorials, or experience-specific guides. In addition, built-in tutorial functionalities can be used to show users and/or providers how to complete one or more experiences or utilize platform functionalities. Further, the XR platform may include telecommunication capabilities between providers using our web portal and users in extended reality, which further enables systems for remote and distributed simulation training, treatment, diagnosis, assessment and/or quality improvement. Web application users may place markers, make annotations, and/or control rendered objects for users in XR in real-time or near real time to assist them in completing XR experiences. All experiences and sessions on the XR platform are capable . . . of being screencast locally or remotely to users, providers and/or instructors using the web application. Controlling and customizing any of the features may be accomplished at the individual, user, or institution level, and users, instructors, or other users may customize experiences either asynchronously or synchronously in real time or near real time.

The XR platform may utilize one or more humanoid avatars capable of natural language and conversational interactions to interact with one or more users with regards to one or more topics relating to health or wellness. The avatar utilizes one of many emotional facial expressions and emotional voice controls during interactions, and may serve as an empathic health or wellness guide.

One platform feature allows users to create or contribute to the creation of one or more virtual and/or augmented reality experiences while in virtual and/or augmented reality.

The XR platform may allow for varying one or more elements within the same extended reality experience along with integrated surveys in an automated system for A-B testing of simulations. In addition, it may allow for collaborative design, iteration, and development through integrated and secure video conferencing between extended reality and a browser-based web application. The data collection and replay capabilities allow for assessment of utility as well as ongoing iterative evaluation of individuals, groups of individuals, or an entire population at one or more points in time. Following the conclusion of any experience or scenario, user responses and scenario actions are automatically collected and scored for automated evaluation. Users may then view a replay a video of the completed experience or scenario from either a first- or third-person perspective allowing users to replay their simulation experiences through 3rd person perspectives, including through the eyes of another avatar. Replay or debriefing scenarios or experiences may include one or more assessments or other platform features. Debriefing scenarios may include the delivery of feedback or facilitated simulations as a conduit to ecologically deliver feedback. At the end of any training scenario or experience, users may additionally be asked for feedback on experience content, style, usability, feasibility, and potential scalability, with all user responses being automatically compiled and organized into an end-user feedback report viewable on a browser-based web application, printable, and/or downloadable or sharable.

Users may be allowed to complete or repeat scenarios across a broad range of difficulty levels.

One platform feature allows users or providers to create, customize, and deploy clinical skills, training education and/or simulation training through allowing users, patients, or instructors to construct experiences using a combination of didactic content, guided tutorials, clinical or simulation scenarios.

Users, patients, and/or instructors may utilize their own custom educational materials (including images, slides, text, audio, and educational videos), which they can combine with 3D existing experiences. Experiences may have a range of different difficulty levels and experience variations.

Modular scenario features, which may be assembled or executed in any order as configured may include one or more of the following: features within a scenario may additionally consist of safety, case development, standardized training, feedback, assessments, program management and/or professional development elements. Some examples of these modules include, terminology, professional integrity, participant objectives, simulation facilitation, the facilitator, debriefings, as well as participant assessment and evaluation or assessment. Another example module includes features to incorporate standards and best practices into applications in immersive treatments, diagnostics, therapeutics, simulation training. Yet another example module delivers immersive empathy training to improve non-verbal cues of emotion as well as verbal responses to opportunities for compassion, and expressing statements of validation using tools such as name the emotion, express understanding, show respect, summarize and show empathy. Yet another example module delivers sexual-harassment training that predominantly focuses on appropriate language and word choice, using automatic speech recognition and natural spoken language, dialogue, and/or other artificial intelligence model. Another example module delivers tailored educational content that incorporate's particular personal, cultural, or socioeconomic perspectives. Yet, another example module includes scenario based simulations to educate, instruct, or train personnel at healthcare facilities in bystander intervention strategies using one or more elements in the following framework:

1. noticing a potentially problematic situation
2. interpret the situation (appropriate to intervene?)
3. decide how to intervene
   direct and respectful
   distraction
   help from others present
4. post situation details, documentation, replays and/or debriefings All scenarios may be completed through any combination of natural spoken language (the users voice), intuitive hand-based selections or gestures, controller-based inputs, or other patient input methods. Customizable features may additionally include abilities to change one or more of the following:

1. which elements are applied within the scenario
2. the order in which the events within a scenario unfold
3. which questions appear and the timing of when these questions appear
4. elements or features that may be particular to the scenario
5. the application of one or more nonplayer character avatars
6. the behavior or actions of any non-player character avatar (which may include the intensity of that behavior)
7. the appearance of any particular avatar
8. the voice or voice characteristics of any avatar
9. the application of any text, video, and/or image stimuli
10. the volume of audio, as well as the application of additional visual and/or audio elements (such as the sights and sounds of alarms within a medical inpatient unit)

Within any scenario, any customizable element, the presence or characteristics of any item, or any action or behavior of the user, patient instructor, or nonplayer character avatar can be logged and used for later review or debriefing. User actions that can be tracked include positional tracking data, voice or audio data (including a text transcript of anything said by the user as well as tone of voice), user entered answers to questions occurring either before or after any scenario are also recorded. Any data produced by experiences or simulations can be combined with replay videos showing a user's attempt at any given scenario from either a first- or third-person perspective, making for an ecological and impactful debriefing and post-scenario review.

The XR platform allows for the integration or use of machine learning or artificial intelligence models to identify subtle behavior patterns amongst those that may be more or less likely to engage in certain behaviors or not.

Instructors or users may further customize or configure training scenarios or experiences using a set of web application based editor tools including the capability for instructors to build or configure immersive scenarios. These editor tools may additionally include the ability to configure possible avatar responses and emotions either during or prior to any simulation experience.

The use of avatars may be utilized for delivering scenarios or experiences where patients, users, and/or non-human avatars make value and emotionally-laden statements expressed by an avatar representation of the patient, user, or non-human avatar using facial animations, body language animations, or through changes in the tone of voice being used. This feature may additionally allow users to identify observed emotions and answer with appropriate responses. In addition exemplary embodiments of the XR platform may include a personal space avatar highlighting system, which overlays a transparent layer of green, yellow, or red (or any other set of colors) on top of an avatar to provide direct visual feedback to the user. In one example, the green, yellow, and red avatar highlighters indicate an appropriate distance, a distance from another avatar that is approaching their personal space, and a distance from another avatar that is invading someone's personal space, respectively. This tool can be turned on or off asynchronously or in real time by instructors, and may be used for providing empathy (for example, for sexual harassment victims) as well as for simulation training to teach users how to respect the personal space of others. Further, this tool may be used for remediation efforts for appropriate individuals.

A variation of this feature utilizes transparent, semi-transparent, or opaque layer of green, yellow, orange, or red on top of one or more objects appearing within a virtual or augmented reality experience to provide direct visual feedback to the user, which indicate the levels by which a virtual avatar or other object approaches the personal space or distance from another avatar.

Any scenario or simulation may utilize adaptive learning techniques to ecologically facilitate personalized learning in a way that can be evaluated and tracked at the individual or group level over time.

Embodiments of the XR platform may include customizable features related to social determinants of health, geographic region, or appropriate sexual harassment-related considerations. These embodiments may include features allowing user(s) to select the language spoken, simulation scenarios that take into account religious or cultural preferences, the utilization of voice-over tracks that take into account religious or cultural preferences, or the incorporation of accessibility enhancing elements such as magnification and contrast enhancement for individuals with vision impairment, volume adjustment and closed captioning for individuals with bearing impairment, voice control for individuals with motor impairment, or gaze control for individuals with motor impairment.

Users, providers, or instructors can alter the selection of the voice to be used for voice-overs including voices of different genders or accents. They may also configure the minimal distances from user beyond which non-player character or other user avatars cannot traverse (so that no user feels as though their personal space is invaded). Additionally, they may also select an avatar from a pool of options with different skin tones, genders, disabilities, and other characteristics (such as height and weight).

Generally Applicable/Platform-Wide Features

A set of "facility admin" features allows for certain staff at client facilities to be granted access to one or more administrative capabilities. The facility admin features allow for capabilities such as:

The ability to add new web app user accounts for staff at their facility.

The ability to assign head mounted display devices to staff at their facility.

The ability to upload facility or organization-specific media for use within XR at their facility.

The ability to create or modify facility specific scene or session configurations.

The ability to create or modify facility specific regimens.

The ability for facility admins to access and explore the sessions completed for any device at their facility along with any data generated during these sessions.

Access to tools that allow for the installation of the XR platform onto head mounted displays as well as other provisioning steps that are required to be completed prior to the use of a head mounted display.

Enable one or more sessions on one or more devices at their facility.

Assign one or more sessions to one or more devices at their facility.

A feature to enable providers on the web app that are involved in synchronous encounters (with patients in XR) to deploy a set of one or more audio and/or visual elements in real-time and/or near real time for a distraction from potentially painful stimulation during a therapy, an assessment, or during a medical, surgical, or other procedure.

A feature to create, enable, select, configure and/or deploy one or more mini-games or tasks for any user to experience or complete within any scene within XR. These mini-games or tasks may be deployed asynchronously or synchronously by providers using the web app in near real time. A feature to enable providers, admins, facility admins, or ML/AI models to create or modify one or more audio tracks and then subsequently upload them to the XR platform and subsequently giving users autonomy to select their preferred music, voiceovers, and/or ambient audio from a pre-screened list of audio tracks while they are in XR.

On-demand passthrough augmented reality safety feature that enables providers involved in synchronous encounters with patients to turn on the augmented reality pass through camera dynamically in near real time whenever appropriate in a clinical setting (such as whenever a better visual representation of the real-world surroundings of a user would be advantageous from a safety standpoint). Oppositely, providers may also turn off the augmented reality pass through camera dynamically in near real time whenever appropriate during a synchronous encounter for a greater level of immersion. This feature may be utilized either remotely or in person and is controlled by a provider using the web application.

Exemplary AI Guide Feature

An "AI Guide" feature is a set of capabilities that utilize platform data to deliver personalized engagement, to achieve user specific goals, and/or to facilitate users completing one or more health and/or wellness related tasks through the use of one or more rendered, virtual, haptic-based, audio-based and/or programmatic entities in XR. AI Guides follow a generic set of steps: Perception, Processing, Decision Making and/or AI Guide Actions to accomplish this work.

Perception is the AI Guides intake of platform data, its transformation into a form of format that is usable by other platform actions and/or other platform features, and the loading of these data for use by other platform actions and/or platform features. Platform data perceived by the perception capability includes data relating to the detection, recognition, classification or identification of objects, actions, interactions, behaviors, body language, cognitive schema, level of consciousness, emotions, movements, gestures, images, materials, effects or sounds. Platform data perceived by the . . . perception capability may also include data relating to the configuration, state, properties, parameters, attributes, position, size, scale, rotation or other characteristics of one or more scenes, sessions, objects, actions, behaviors, body language, cognitive schema, emotions, movements, gestures, images, videos, items of text, collisions, materials, effects or audio data. Platform data perceived by the perception capability may also include data relating to one or more events, locations, codes, points of physiologic data, or data relating to collisions between two or more objects in XR. Platform data perceived by the perception capability may also include data relating to one or more questions or responses.

Processing by an AI Guide is the processing of any data delivered through perception and/or through utilizing any platform data within a database, with this processing being completed by one or more platform features and/or one or more ML/AI models. The term "database" may include but is not limited to any structured database, unstructured database, graph database, vector store, short term memory, long term memory, file storage, blob storage, cache, and/or any other type of data storage. Processing may also be utilized to derive or decide amongst a set of possible next actions for the AI Guide to take given the user's goals and/or any possible health and/or wellness related tasks.

One variation of the processing feature includes an additional feature where the next derived or decided upon action is determined through an evaluation of which next possible action has the lowest associated cost. For clarity "cost" may mean financial cost, amount of physical activity required, opportunity cost of time, mental cost, physical cost, emotional cost, or any other negative outcome or metric. This process of decision making may include steps where processing is applied to decide amongst a set of next possible actions for the AI Guide to take, to determine what the user's intention is, or to determine what the AI Guide's intention should be.

Using platform data, platform features, or any outputs of perception, processing, or decision making capabilities, AI Guides may take AI Guide actions to influence a user's actions, behavior, level of engagement, level of motivation, level of consciousness, or to complete health or wellness related tasks. AI Guide actions include any platform actions, any patient platform actions, any changes to a scene or session configuration, or any changes to an ML/AI model, state, property, parameter, hyperparameter, attribute, position, size, scale, rotation, material, object, action, behavior, question, response, body language, cognitive schema, emotion, movement, gesture, image, video, item of text, collision, event, effect or sound. AI Guide actions may also include a change in which events and/or perceptions trigger which actions, platform actions, and/or patient platform actions. AI Guide actions may also include a change in aspects, parameters, configurations, hyperparameters, or other elements relating to one or more ML/AI models, or a change in which ML/AI models are utilized with the context of other Platform features. AI Guide actions may additionally include the creation, modification, or configuration of a data structure or data storage. This may include for example, a structured database, unstructured database, graph database, vector store, short term memory, long term memory, file storage, blob storage, cache, or other type of data storage.

Exemplary World Feature

The World is a set of features capable of instantiating, generating, modifying, configuring, and/or destroying XR experiences and/or any combination of one or more Object(s), images, videos, Location(s), Event(s), World Action(s), AI Guides, and/or other virtual entities within XR. This includes, but is not limited to, one or more 3D objects, virtual terrains, virtual skyboxes, lighting, particle effects, images, videos, audio elements, text, AI Guides, one or more other Platform features, and/or one or more other elements within XR. Any of these entities may be instantiated, generated, modified, configured, and/or destroyed by one or more ML/AI models, patients, patient input methods, providers, and/or by one or more other platform features, each of which may be informed by one or more points of platform data.

Object(s) may include but are not limited to one or more real world objects, virtual objects, content objects, one or more applicable object states, traits, attributes, applicable descriptors, and/or related items of media (e.g. video, image, audio, 3D objects, text). Objects may have GUIDs, coordinates (e.g. GPS coordinates), non-fungible tokens, and/or other ID(s) associated with them. Users, providers, and/or ML/AI models may select, modify, configure, assign, and deploy one or more objects to one or more head mounted displays so that the users of these head mounted displays may subsequently experience these items in XR.

Location(s) may include but are not limited to real world locations, virtual locations, and/or any related descriptors and/or media (e.g. video, image, audio, 3D objects, text). Locations may have one or more objects associated with them, each with or without an associated timestamp. Locations may have GUIDs, coordinates (e.g. GPS coordinates), non-fungible tokens, and/or other ID(s) associated with them.

Examples of event(s) include: real world events, virtual events, and/or any related timestamps, descriptors and/or media (e.g. video, image, audio, 3D objects, text). Events may also include the completion of one or more medical code criteria, including billing code data, diagnosis code data, cost data, quality or performance code data; the capture of any image or video of the patient from any first-person or third-person perspective or any camera; the capture of any audio produced by a patient from any microphone; the capture of any data relating to a collision between any two or more objects within a virtual environment; any element, feature, or characteristic obtained or derived from the application of one or more ML/AI models applied to platform data; the capture of any movement data; the capture of any virtual or real-world (e.g. controller) button press data, data produced by any patient input methods; the capture of any other data generated within any scene, session, or regimen.

Events may have one or more objects associated with them, and each may have an associated timestamp. Events may have GUIDs, coordinates (e.g. GPS coordinates), non-fungible tokens, and/or other ID(s) associated with them.

World action(s) include platform actions, patient platform actions, AI Guide actions, or changes relating to location(s) or event(s). World actions may also include creating, modifying, configuring, deleting, or instantiating one or more virtual objects, scenes, sessions, regimens, medical code criterion, medical codes, media, or events. In addition World action(s) may include the creation, modification, configuration, deletion, or instantiation one or more ML/AI models.

The World may be integrated with one or more other platform features to autonomously or semi-autonomously create, configure, improve and/or modify one or more scenes or sessions for one or more patients.

In one variation, the World is integrated with the Iterative ML/AI feature to form a capability that allows users to create, modify, customize, train, view, interact with, or experiment with one or more ML/AI models or AI Guides while in XR.

Generative XR World Creation Feature

Figure 2:
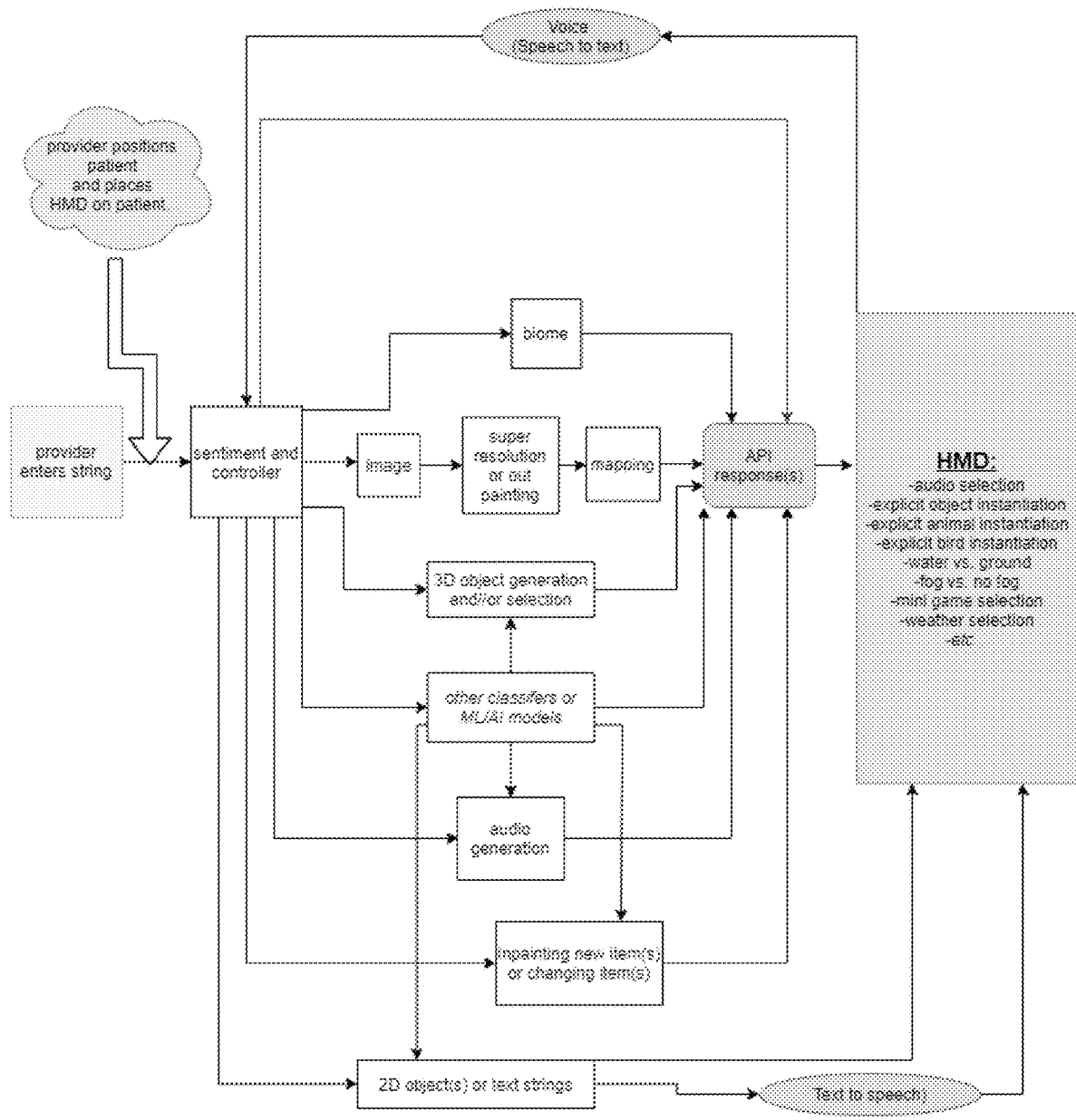
FIG. 2 is a further diagram demonstrating one exemplary implementation of the present XR platform.

Referring to the diagram of FIG. 2, the exemplary XR platform of the present disclosure may include a feature that allows for XR experiences to be dynamically created, edited, configured . . . or modified (referred to herein as the Generative XR World Creation Feature; identified commercially by Applicant as the Wayaverse™ platform). To accomplish this, first, an input prompt is produced, and this may occur when for example, a provider enters a text prompt using the web application, or when a patient in XR uses their voice to deliver a spoken prompt which gets converted to text using a speech to text model. The input prompt serves as an input for one or more ML/AI models or platform features, and if the outputs of these ML/AI models or platform features meets or exceeds pre-determined or configurable threshold(s), the input prompt is next sent to a controller. The controller functionality processes the input prompt using one more ML/AI models, platform features, and/or points of platform data to determine which additional ML/AI models, platform features, and/or points of platform data will be utilized for further processing of the prompt. This further processing yields a classification of one or more elements within an XR experience that a user may find desirable.

Some examples of these additional processing steps include: one or more generative models for producing images, or videos to be rendered in XR (including as the "skybox" within one or more XR experiences), and such images or videos may undergo additional processing steps. For example, one or more "super resolution" models or "out painting" models may be applied to alter the resolution or dimensions of the image(s) or video(s), respectively. In addition, one or more ML/AI models or other platform features may be applied to map the image(s) or video(s) onto one or more shapes and/or into one or more forms better suited for XR. Additional processing steps may also include the use of one or more ML/AI models or other platform features to stitch one or more image(s) or video(s) together.

In one variation of the Generative XR World Creation Feature one or more classifiers, ML/AI models, or platform features may be applied to the input prompt which then subsequently determines which additional steps may be applied. These additional steps may include the use of one or more classifiers, ML/AI models, or platform features for audio generation, prompt editing, inpainting, out painting, image editing, or video editing. These additional steps may also include one or more classifiers, ML/AI models, or platform features for determining which environment type or biome best matches the desired environment based on the input prompt, for generating or selecting one or more 3D objects, 2D objects, images, videos, items of audio content and/or strings of text to instantiate in XR. After any additional steps are completed, the outputs are delivered to the user in XR.

In one variation of the Generative XR World Creation Feature the user in XR may make additional requests using Patient input methods to trigger one or more of the steps described above to request one or more changes or additions to be instantiated or generated within their current experience. These changes may include the addition, removal, or modification of one or more 3D objects, 2D objects, images, videos, items of audio content or strings of text within XR. These changes or additions may additionally include the addition, removal, or modification of one or more aspects relating to virtual human avatars or AI Guides. These changes or additions may further include a request for one or more mini-games to be instantiated, or a request for a new XR experience.

In one variation of the Generative XR World Creation Feature, a text, audio, rendered object, image, or video based prompt and related meta data produced in XR are sent to a remote server or on device application which are used in one or more of the following processing steps before returning any outputs back to the XR application or web application:

Assess the sentiment of the incoming prompt and related meta data.

Classify the most likely emotion of the incoming prompt and related meta data.

Rewrite or constrain the incoming prompt.

Add which if any negative prompts should be utilized.

Determine which set of one or more environmental, contextual, locational, or setting based characteristics, items, or objects best fit the desired output based on the input prompt and related meta data.

Determine which image, video, text, audio or rendered object generation models should be utilized in producing any image, video, text, audio or rendered object outputs.

Determine which image, video, text, audio or rendered object generation model hyperparameters should be utilized in producing any image, video, text, audio or rendered object outputs.

Determine which, if any, post-processing steps may need to be applied to any output images, videos, text, audio or rendered objects, as well as applying them. For example, an output image may have one or more undesirable aspects within it that are removed or replaced using ML/AI model(s) for image inpainting or editing images. For example, an output image or video may need to be reformatted or the resolution may need to be changed so that it may be subsequently displayed in XR or on the web application.

In all variations of the Generative XR World Creation Feature, the inputs or outputs may include text, audio, rendered object, image, or video-based content, and each of these inputs or outputs may have interactive and/or non-interactive elements along with other programmatic functionalities.

A variation of the Generative XR World Creation Feature in which the provider creates experience templates which may be applied to one or more patients. These experienced templates are compositions of one or more 3D objects or platform features that are programmatically controlled within one or more scenes or sessions. The outputs of ML/AI models or classifiers then add any remaining objects or functionalities not provided by the experience template that may be needed for a particular set of patient(s) or health-related scenario(s).

Overview of Exemplary Medical Coding Classifier System

The medical coding classifier system leverages the capture of platform data as well as data input by the provider to constitute one or more individual coding criteria. Templates for medical codes can be entered into the system, with one or more criteria forming such codes that may relate to billing, insurance, cost, quality, diagnosis, and/or any other coding schema relating to healthcare. Completed and/or partially completed code templates produce Output Reports. Codes are comprised of criteria, which are composed of criterion types. Both codes and criterion may have one or more dates, date ranges, labels, tags, diagnosis codes, other codes, descriptions, Boolean fields, properties and/or GUIDs associated with them.

Criterion types are the fundamental building blocks used in composing billing codes or other codes. Codes are automatically populated with the data for their constituent criteria (if available) whenever a report is generated or run. Criteria may be marked as mandatory or optional, and if optional, at least one criterion amongst any set of optional criteria must be met. Criterion types may include any of the following given a particular patient, code, and time period: if a code was not previously billed for; if a content object with a certain tag applied to it was utilized within XR; the duration of any scenes of a particular scene type utilized; the duration of any scenes with a particular tag applied to them that are utilized; the duration of any sessions with a particular tag applied to them that are utilized; if one or more particular diagnosis codes apply to the patient; if the patient has provided informed consent either within XR using related Platform features or verbally to their provider; if one or more surveys or question and answer elements were completed by the patient along with any respective questions and the patients responses; the duration of any applicable telehealth encounters occurring on the XR platform along with the particular modality used for the encounters (e.g. audio, audio and video). Whenever content objects, scene types, tagged scenes, or tagged sessions are utilized as criteria, the associated Platform data produced by the respective content objects, scenes, or sessions may be extracted, transformed into the appropriate format, and loaded into applicable reports. Criteria types may additionally include any provider question and answer data, any text entered by the provider, any provider selections, or any other data entered by a provider using the web application or XR. Sample code criteria types include:

CodeNotPreviouslyBilled
 ContentObjectWithTag
 DurationOfSceneType
 DurationOfSceneWithTag
 DurationOfSessionWithTag
 ICDCode
 ProviderBooleanInput
 ProviderTextinput
 ProviderSelectionInput
 PatientConsentInput
 SurveyCompleted
 TelehealthUsed The Criteria Completion Feature enables a computer-implemented, extended-reality (XR), or web-based identification, classification, or documentation of medical coding criteria (i.e. required items). These criteria may include criteria required for billing, quality, cost, inventory, or diagnosis codes, or other codes relating to healthcare. The Criteria Completion Feature identifies, classifies, documents by executing the steps or procedures entered into criteria templates. Criteria templates allow platform administrators to construct templates of codes and assign platform data fields to them which are subsequently populated with the appropriate data needed to fulfill these criteria by a patient in XR. Any items requiring provider input are completed by the provider on the web application or using XR.

The Code Completion Feature enables a computer-implemented, extended-reality (XR), or web-based system for the autonomous or semi-autonomous identification, classification, documentation, or completion of one or more codes relating to billing, quality, cost, inventory, or diagnosis codes, or one or more other codes relating to healthcare.

Output reports of the coding system are curated sets of platform data relating to a particular patient, code, and time range that contain a structured presentation of these data formatted for a specific purpose within health or wellness (for example, to serve as documentation of the outputs of a classifier relating to a patient, or to serve as the documentation needed for a particular billing code). Output reports of the coding system may either be "uncompleted", "completed but not yet finalized", or "finalized". Uncompleted reports identify any unfulfilled criteria for the medical code(s) of interest. In one variation any unfulfilled criteria identified after a user completes a scene or session may be used in informing the configuration for a scene or subsequent session, and so on. In another variation any unfulfilled criteria identified after a user completes a scene or session may inform the modification, configuration or selection of one or more ML/AI models or other Platform features in order to create, configure, modify, select, or assign one or more content objects, scenes, sessions, regimens or platform features to the applicable patient(s) to subsequently experience in XR. Output reports may include timestamps of when providers start or stop any telehealth interaction, . . . the identification of any involved providers or patients, the setting (for example inpatient or outpatient), any applicable diagnosis code(s), any applicable or required timestamp or time duration information, any applicable scene or session data, any applicable documentation of patient consent, any required provider attestations, any other applicable information entered by the provider, or any other information applicable or required for the particular code contemplated by the report. Examples of Platform data populating to output reports in this manner include session data, scene data, Q&A data, range of motion data, neurocognitive testing data, history of present illness data, any data entered by the provider using the web application, or any related datetime or timestamp data. Any related datetime or timestamp data may include timestamps, durations, or other datetime information relating to telehealth encounters, scenes, sessions, or the utilization of one or more codes. One variation of the coding system enables the implementation of any needed code replacements. For example, use code xxxxx instead of code yyyyy for scenarios meeting a set of one or more other thresholds, policies, or requirements.

User Flow and Mechanics of Exemplary Medical Coding System

Figure 3:
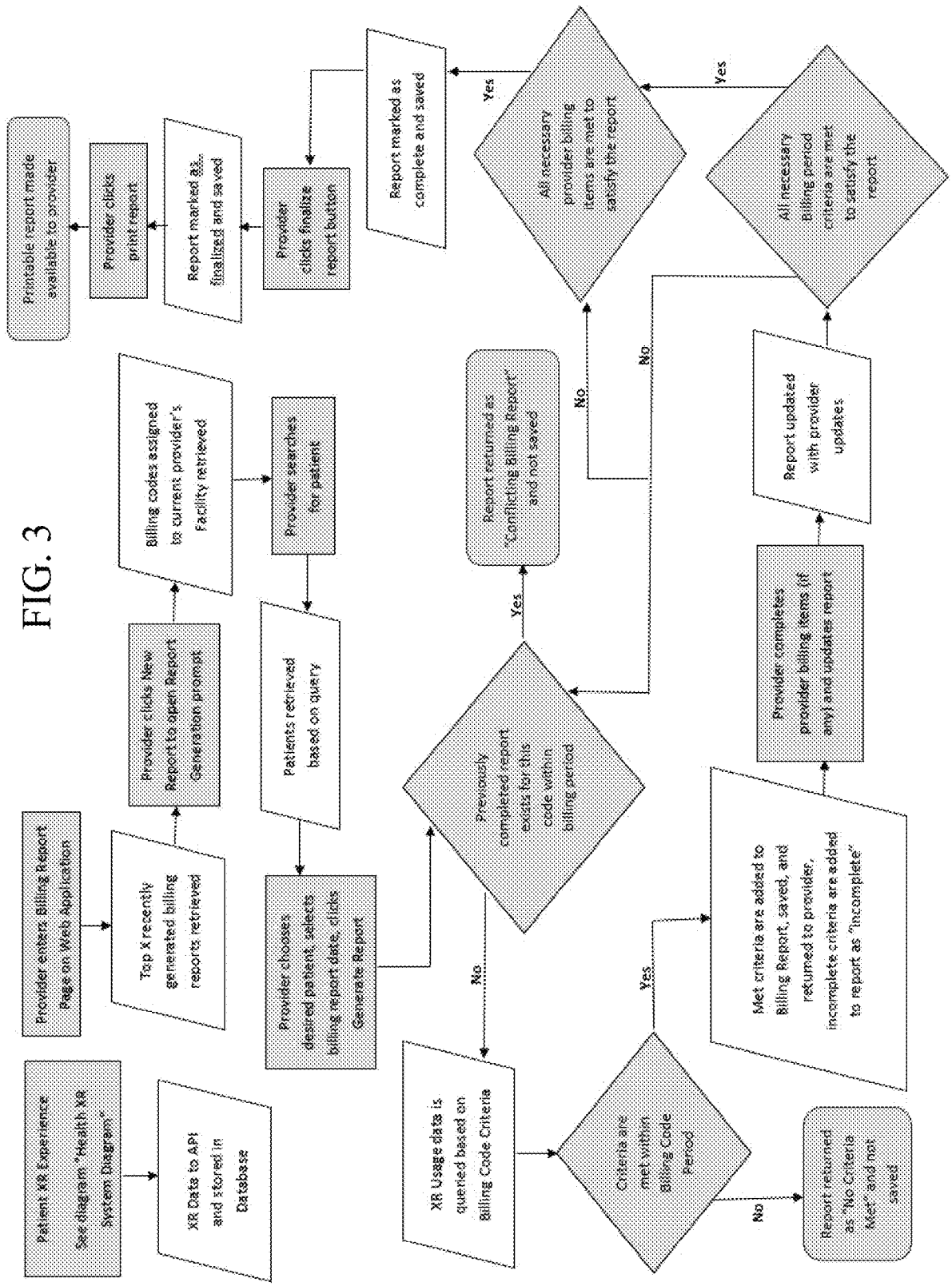
FIG. 3 is a further diagram demonstrating exemplary billing implementation.

Referring to FIG. 3, the provider logs-on to the web application and then goes to the billing report page where billing reports for the applicable facility may be accessed, completed, and exported. The provider clicks on the new report functionality to open a prompt for generating reports and any Codes assigned to that facility are retrieved. The provider may next search for and select one or more patients, one or more Codes, and or one or more date ranges and then clicks "generate reports".

Next, a set of one or more reports are generated, with each item within each report containing any data produced on the XR platform that fulfills any of the needed criteria for any code and the given date range. Any criteria that have not been fulfilled for a particular code and the given date range are also added to the report as "incomplete". If the provider clicks "generate report" and there exists a previously completed report for that patient, date range and/or facility, the system will return the report as a "Conflicting Billing Report" and it will not be saved. If there are zero criteria that have been met for that patient, date range and/or facility, the system will return the report as a "No Criteria Met" and it will not be saved.

In one variation there is no need for the provider to utilize the new report functionality as well as the functionalities for generating reports. Instead, in one variation, only the date range is selected and all possible reports for all possible patients at a given facility or for a given provider are automatically generated with any applicable data meeting the necessary requirements for any criteria within any of the code reports being automatically retrieved and populated to their applicable reports for the applicable patient. Any criteria that have not been fulfilled for any code and date range are also added to the applicable report(s) as "incomplete". If there are zero criteria that have been met for that patient, date range and/or facility, the system will return the report as a "No Criteria Met" and it will not be saved.

In another variation there is no need for the provider to utilize the new report functionality as well as the functionalities for generating reports. Instead, in one variation, all possible reports for all possible patients at a given facility or for a given provider across all eligible or possible date ranges are automatically generated with any applicable data meeting the necessary requirements for any criteria within any of the code reports being automatically retrieved and populated to their applicable reports for the applicable patient. Any criteria that have not been fulfilled for any code and date range are also added to the applicable report(s) as "incomplete". If there are zero criteria that have been met for that patient, date range and/or facility, the system will return the report as a "No Criteria Met" and it will not be saved.

A report may be marked as "can not complete" if the date range for the report has passed and there remain incomplete items that need to be completed by the patient.

Next, select any previously generated but uncompleted report, and/or they may filter for one or more Codes, based on date(s), based on provider, and/or based on other parameters amongst those billing reports already generated. Once a provider selects any uncompleted report, they may then subsequently complete any items requiring their attention. After the provider submits any updates to items requiring their input and/or attention, any items previously marked as "incomplete" are checked for completion, and if all necessary criteria for a code are met for the selected and/or applicable date range, then the report will be marked as complete, unless another report has been completed for that same code, patient, and date range (at which point the report would be marked as "can not complete").

In one variation, providers do not need to select any previously generated but uncompleted reports. Instead, all previously generated but uncompleted reports for all eligible date ranges automatically populate to a queue of uncompleted reports that require the input and/or attention of that provider. Providers may select any reports within this queue and make any needed updates. After the provider submits any updates to items requiring their input and/or attention, if all necessary criteria for a code are met for the applicable date range, then the report will be marked as complete. Next, for any reports that are marked as complete, after reviewing any information inputted into the report to ensure accuracy, providers may then "finalize" the report by clicking the "finalize report button" to confirm that all information is correct as populated on the report. The report is then marked as finalized, timestamped for the exact time that it was finalized, and an immutable copy of the finalized report is saved. Prior to being finalized, any items requiring provider input may be edited. Once a report is finalized, it can no longer be edited.

Any finalized reports may then be printed, exported, electronically sent to a billing agency, electronically sent to an insurance carrier, electronically sent to any other entity provider desires, and/or integrated into an electronic medical record and/or the patient's health record.

Figure 4:
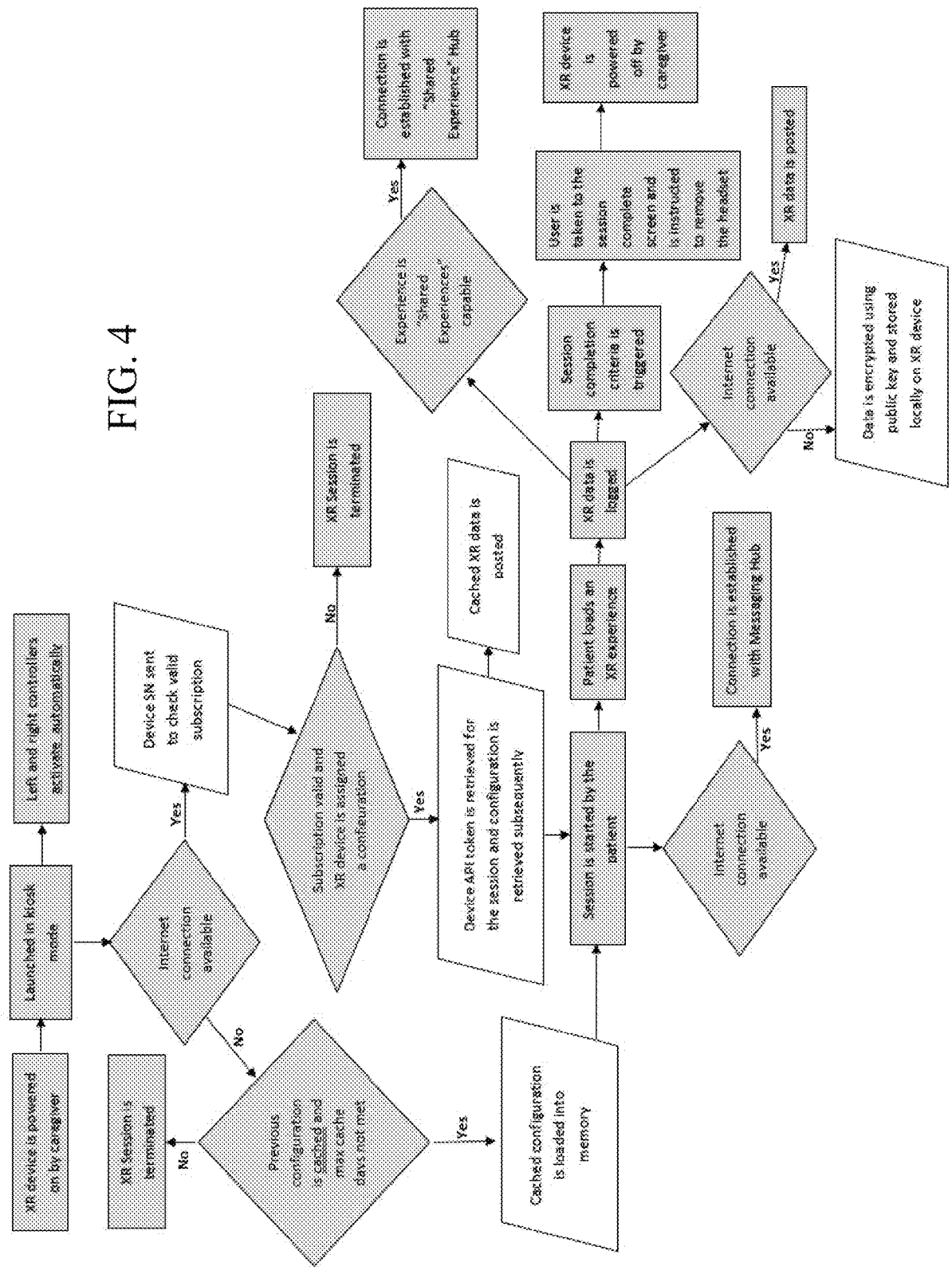
FIG. 4 is a further diagram illustrating the present XR system.

Referring to the diagram of FIG. 4, to start a session an XR device is powered on either by the provider, a caregiver or the patient. Next the present health application is launched in kiosk mode and both controllers turn on automatically.

After the application is launched if there is no Internet connection available, then the previous session configuration is pulled from the cache and the system checks to see if the maximum amount of days has passed where that cache session will be allowed to be used. If this amount of time has passed, then the XR session is terminated. If that amount of time has not passed, then the cache configuration is loaded into memory and the session is started by the patient.

If there is an Internet connection available after the application is launched, then the device serial number is sent to the present API to check for a valid subscription. If the subscription is valid, has not expired, and the XR device is assigned a configuration then the device API token is retrieved for the session and the configuration is subsequently retrieved for that device. If the subscription is not valid, has expired, or the XR device is not assigned a configuration then the XR session is terminated.

If a configuration is successfully retrieved for a device that is online, any cached XR data left on the device is posted to the API and this data is deleted from the device once a successful post is completed. Next, for any device that is online, the retrieved (downloaded or loaded from cache) configuration is loaded into memory and the session is started by the patient.

Once a session is started by a patient if an Internet connection is available a connection is established with the messaging hub, which is a client-to-client messaging system that works via Web socket or HTTP request polling, and is used to exchange information related to voice and/or video communications, or information relating to shared experiences.

Once a session is started by a patient and the patient subsequently selects and XR experience, an XR experience automatically loads for them, or an XR experience is selected by a provider using the web application, if the selected experience is "shared experiences" capable then a connection is also established with the shared experiences hub.

Once a session is started by a patient and the patient subsequently selects and XR experience, an XR experience automatically loads for them, or an XR experience is selected by a provider using the web application, that XR experience loads, and any XR data subsequently generated during the experience is logged. If an Internet connection is available, any logged XR data generated in this way is posted to an API after being encrypted if an internet connection is not available, these data are instead encrypted using a public key and stored locally on the XR device.

The patient may subsequently complete any number of additional experiences and XR data is logged and either stored or posted for each experience as above.

If at any time during the session a session completion criterion is triggered, the user may be taken to the session completion screen and is instructed to remove the XR headset. Some examples of session completion criteria include: if a provider remotely ends the session using the web application; if a pre-configured session duration time limit is met; if a pre-configured set of one or more scenes or experiences are completed; or if the patient selects "end session" within the XR application. After session completion, the headset may be then subsequently powered down by the patient, an in-person provider, remotely by a provider using the web application, or programmatically.

Exemplary Implementation of the Present System

In one exemplary implementation, a client provider first logs-in to the web portal. After logging in, a "Billing" page may be selected. On the billing page, there are two list views: "billing completion forms" and "completed billing reports". Each item on the list view of "completed billing reports" relates to a particular patient encounter and a particular billing code. There may be multiple completion forms for a particular patient if multiple billing codes are applicable or if a new instance of a billing code is allowed. Items may only show on the list view of "completed billing reports" if they have all criteria completed for a billing code instance for a particular patient including any applicable criteria requiring direct provider input. Each completed billing report is a combination of all data needed to satisfy all requirements for a particular billing code in a particular patient. It consists of a combined data set containing all information and documentation needed to satisfy all criteria for a billing claim.

A "completed billing report" also contains "universally needed items." An exemplary sample billing report is copied below.

Completed Items
  Name: Remote physiologic monitoring
  Description: Physical therapy ROM data for PRM.
    Patient experienced cirtual scene: PT Upper Body (Test Patient Facility) p2 Type: Physical Therapy
    Duration: 2.52 minutes

| Cervical Extension | |
| --- | --- |
| Goal Range of Motion: 120 | Non-Lateral Metrics: |
| Repetitions Completed: 5 | Extremity: Head |
| Total Exercise Time: 20.06 seconds | Average Range of Motion: |
| Exercise Start Time: | 40.97805 |
| Apr. 16, 2023 5:12:30 PM | Best Range of Motion: |
| Exercise End Time: | 44.0911 |
| Apr. 16, 2023 5:12:50 PM | |

| Shoulder Abduction | |
| --- | --- |
| Goal Range of Motion: 180 | Left Laterality Metrics: |
| Repetitions Completed: 8 | Extremity: Hand |
| Total Exercise Time: 43.72 seconds | Average Range of Motion: |
| Exercise Start Time: | 83.27192 |
| Apr. 16, 2023 5:13:02 PM | Best Range of Motion: |
| Exercise End Time: | 83.49329 |
| Apr. 16, 2023 5:13:46 PM | |

| Shoulder Abduction | |
| --- | --- |
| Goal Range of Motion: 180 | |
| Repetitions Completed: 8 | Right Laterality Metrics: |
| Total Exercise Time: 47.80 seconds | Extremity: Hand |
| Exercise Start Time: | Average Range of Motion: |
| Apr. 16, 2023 5:13:58 PM | 83.0287 |
| Exercise End Time: | Best Range of Motion: |
| Apr. 16, 2023 5:14:46 PM | 83.49453 |

Name: Remote physiologic monitoring
  Description: Participation in scenes producing RPM data.
    Patient experienced virtual scene: Limb Matching (Test Patient Facility)
    Type: Assessment
    Duration: 0.95 minutes

| Limb Matching<br>Start Time: 5:15:16 PM \| End Time: 5:15:51 PM | User Results |
| --- | --- |
| Limb matching provides a look into proprioceptive ability of an individual. Proprioception is the sense of body position and self-movement. Limitations in this sense can lead to poor stability both at rest (such as standing) or during movement. Complex movement planning (such as during daily activities) is also heavily reliant on the proprioception. | Average Difference: 0.09" Difference Range: 0.09"-0.09" |

Ingram L A, Butler A A, Walsh L D, Brodie M A, Lord S R, Gandevia S C. The Upper Limb Physiological Profile Assessment: Description, Reliability, Normative Values and Criterion Validity. PLOS ONE. 2019: 14(6). Lord, Stephen & Fitzpatrick, R. Choice Stepping Reaction Time: A Composite Measure of Falls Risk in Older People. The Journals of Gerontology. 2001; 56A: M627-32.

Name: Remote physiologic monitoring
  Description: Participation in sessions producing RPM data.
  Sessions:
    Patient experienced virtual session: Billing Master Test
    Session Duration spent in virtual session: 31.71 minutes
    Virtual session comprised of the following virtual experiences:
    Experience Name: Vision Impaired Shooter AR
    Experience Type: Distraction
    Experience Name: Vision Impaired Shooter AR
    Experience Type: Distraction
    Experience Name: Vision Impaired Shooter
    Experience Description: A scene configuration for testing the vision impaired shooting experience
    Experience Type: Distraction

| Activity: Vision Impaired<br>Shooter Score: 320 |
| --- |

Experience Name: Trail Making (patient test facility)
Experience Type: Assessment

| Trail Making Test<br>Start Time: 7:59:54 PM \| End Time: 8:00:34 PM | User Results |
|---|---|
| The Trail Making Test is a neuropsychological test that references visual attention and task-switching. The test can provide insight regarding search speed, processing speed, cognitive flexibility, and executive functioning. The trail making test has been shown to differentiate between non-fallers and fallers. | Total Time: 37.62 s |

Lord, Stephen & Fitzpatrick, R. Choice Stepping Reaction Time: A Composite Measure of Falls Risk in Older People. The Journals of Gerontology. 2001; 56A: M627-32. Hester R L, et al. Demographic Influences on Baseline and Derived Scores from the Trail Making Test in Healthy Older Australian Adults. The Clinical Neuropsychologist, 2005; 19(1): 45-54.

Experience Name: Boxing (Test Patients Facility)
Experience type: Boxing

Activity: Speed Punch
Score: 367

Experience Name: Sit and Reach (Test Patient Facility)
Experience Type: Assessment

| Sit and Reach<br>Start Time: 8:06:35 PM \|<br>End Time: 8:08:02 PM | User Results |
|---|---|
| Reach distance been found to be a reliable measure of flexibility and postural stability among individuals with or without a disability. Fall rates show a significant association with decreased reach distance. | |

Risk Concern Guide:

| Forward | Reach Distance (in) | |
|---|---|---|
| Low | >12.45 | Average Reach (Forward): 1.46" |
| Moderate | 12.45-9.07 | |
| High | ≤9.08 | |

| Right | Reach Distance (in) | |
|---|---|---|
| Low | >8.88 | Average Reach (Right): −0.83" |
| Moderate | 8.88-7.08 | |
| High | ≤7.09 | |

| Left | Reach Distance (in) | |
|---|---|---|
| Low | >8.73 | Average Reach (Left): −0.16" |
| Moderate | 8.73-6.86 | |
| High | ≤6.87 | |

Annie A. Butler, Stephen R. Lord, Richard C. Fitzpatrick, Reach Distance but Not Judgment Error is Associated With Falls in Older People. The Journals of Gerontology. 2011; 66A(8); 896-903. Newton, Roberta. Validity of the Multi-Directional Reach Test: A Practical measure of Limits of Stability in Older Adults.

Experience Name: Reaction Time (Test Patient Facility)
Experience Type: Assessment

| Reaction Time<br>Start Time: 8:08:30 PM \|<br>End Time: 8:09:58 PM | User Results |
|---|---|
| Reaction time testing is part of a validated test battery that has been shown to differentiate fall risk. Slow reaction time can impair one's ability to respond to unexpected obstacles. Poor reaction times can be due to perceptual issues, processing and executive failures, or sleep deprivation.<br>Risk Concern Guide:<br>Low: <233 ms<br>Moderate: 233-281 ms<br>High: ≥282 ms<br>Abnormal responses:<br>No response<br>Triggered without stimulus | Average Time: 336 ms (291 ms-449 ms)<br>Abnormal Responses: 0 |

Lord S R, Menz H B, Tiedemann A. A physiological profile approach to falls risk assessment and prevention. Physical Therapy. 2003; 83: 237-252.

Experience Name: Functional Reach (Test Patient Facility)
Experience Type: Assessment

| Modified Functional Reach<br>Start Time: 8:10:13 PM \|<br>End Time: 8:12:32 PM | User Results |
|---|---|
| Functional reach has been shown to correlate with physical frailty to a greater degree than age, and functional reach has also been shown to strongly associate with Instrumental Activities of Daily Living. | |

| Age | Male (in) | Female (in) | |
|---|---|---|---|
| 20-40 | 16.7 +/− 1.9 | 14.6 +/− 2.2 | Average Reach (Right): −1.3552116363333333" |
| 41-69 | 14.9 +/− 2.2 | 13.8 +/− 2.2 | Average Reach (Left): −1.8132805833333334" |
| 70-87 | 13.2 +/− 1.6 | 10.5 +/− 3.5 | Average Reach (Forward): 3.5644690066666667" |

Increased fall risk: Max reach distance of ≤6 inches

Duncan, P W, el al. Functional reach: A new clinical measure of balance. The Journals of Gerontology. 1990; 45: M192. Duncan, P W, et al: Functional reach: Predictive validity in a sample of elderly male veterans. The Journals of Gerontology. 1992; 47: M93. Weiner, D K, et al: Does functional reach improve with rehabilitation. Arch Phys Med Rehab. 1993; 74: 796.

Experience Name: Limb Matching (Test Patient Facility)
Experience Type: Assessment

| Limb Matching<br>Start Time: 8:13:03 PM \|<br>End Time: 8:13:37 PM | User Results |
|---|---|
| Limb matching provides a look into proprioceptive ability of an individual. Proprioception is the sense of body position and self-movement. Limitations in this sense can lead to poor stability both at rest (such as standing) or during movement. Complex movement planning (such as during daily activities) is also heavily reliant on the proprioception. | Average Difference: 0.03"<br>Difference Range: 0.03"-0.03" |

Ingram L A, Butler A A, Walsh L D, Brodie M A, Lord S R, Gandevia S C. The Upper Limb Physiological Profile Assessment: Description, Reliability, Normative Values and Criterion Validity. PLoS ONE. 2019: 14(6). Lord, Stephen & Fitzpatrick, R. Choice Stepping Reaction Time: A Composite Measure of Falls Risk in Older People. The Journals of Gerontology. 2001; 56A: M627-32.

Name: Remote physiologic monitoring

Description: For new patients or patients who have not seen the billing practitioner within one year, RPM services must be initiated during an initial face-to-face visit with the billing practitioner, such as a Preventive Physical Exam or an exam included in Transitional Care Management.
Select one of the following
  This patient: is not a new patient AND I have seen this patient: within the past one year.
Name: Remote physiologic monitoring
Description: 30 minutes reviewing, interpreting, modifying care plans, and responding to RPM data.
I spent at least 30 minutes reviewing, interpreting, modifying care plans, and responding to RPM data relating to this patient.
Name: Ordering provider credentials
the type of provider that ordered RPM (must be NP, PA, MD, or DO).
Select type of provider that ordered RPM (must be NP, PA, MD, or DO).
  Medical Doctor (MD)
Incomplete Items
Name: Remote physiologic monitoring
Description: At least 30 minutes of time spent by a physician or qualified healthcare professional during a 30-day period reviewing, interpreting, and responding to RPM data.
Provider Items
Provider Assessment/Plan
  Assessment language here . . .
  Plan language here . . .
Finalized by Apr. 23, 2023, 6:43 AM

---

I personally spent _____ minutes involved in the care of this patient which includes time interviewing, patient exam, reviewing data, performing and reviewing assessments, as well as forming a plan. I understand that the Waya Health Platform records and presents information that I have input into the platform. As such, I acknowledge I am responsible for the accuracy of the information contained in this report as well as any claims submitted to insurance payors.
        Provider Signature _____ Date _____

---

Each completed billing report is added to the list view of "completed billing reports". Any of the reports within this list view may be selected to produce a printable pdf document, with the printable pdf document having one or more of the following characteristics (see attached image of an example report): a box for client logo, a box for a patient sticker, documentation of patient consent, a "main data box" containing all of the criteria for a particular code type as well as the documentation serving to fulfill each criteria for this patient and this billing code instance, any applicable references, standardized provider attestation language, a space designated for a company logo.

If the provider or billing specialist clicks on an item in a list view of "billing completion forms", a form then appears which contains the criteria already fulfilled as well as questions/fields necessary to obtain all remaining information needed to satisfy all criteria for the related billing code and patient ("provider completed form data"). The provider completes the form and presses submit.

Exemplary Enhancements and/or Integrations to Medical Coding Classifier System

A patient consent feature is configurable at the session level and enables the execution of informed consent within XR. This consent appears as a text canvas with or without an accompanying voiceover and has an "I agree" or similar button that the patient is required to click to move on to other experiences. Once the patient confirms that they consent, an immutable copy of this consent is permanently stored. There are two versions of this type of consent an XR version (for example, a consent canvas and clickwrap appearing with XR), and a web app version appearing within a patient-facing or provider-facing web application.

Exemplary Medical Coding Classifier System

The Medical Coding Classifier System of the present disclosure may include a feature that determines if a particular set of one of more diagnosis codes is already applicable to a particular patient. For example, whenever a provider "completes/finalizes" a code report any diagnoses selected on that report are added to the that respective patients list of applicable diagnoses codes. As another example, if a patient already has any diagnosis code(s) required for any other coding convention, then these diagnosis code(s) automatically appear on the respective criteria or code report when applicable.

The Medical Coding Classifier System may include a feature to orchestrate and manage the integration of one or more datasets or external application programming interfaces (APIs) with information relating to medical/healthcare coding systems or conventions, such as billing codes, cost-related codes, inventory related codes, medical coverage determination data, insurance related data or coding systems, patient data, healthcare system data, or data relating to a patient's electronic medical record.

The Medical Coding Classifier System may additionally include a feature to control which criteria and/or which codes can be applied more than once within a specified duration of time for a particular patient.

The Medical Coding Classifier System may additionally include a feature to prevent the same instance of any criterion from being applied to more than one code for a particular patient.

The Medical Coding Classifier System may additionally include a feature that applies one or more logical/boolean (such as "AND", "OR", "NOT", "IF→THEN", and the like) on one or more code criteria, codes, or other platform data, and then if any logical statements constructed in the aforementioned manner evaluate to true, the assigned criteria, code(s), or other platform data qualify to be applied towards one or more criteria and/or code reports. Any of these logical expressions comprised of platform data may also be bound to a particular date range (or only applicable during a particular date range). Any of these logical operations, expressions, date ranges, or applicable platform data may be entered, created, modified, or deleted by one or more patients, providers, platform features, or ML/AI models. For example, for criterion X to be applicable to code Y, it must not already be applied to criterion or code A or B or C during the applicable date range. As another example, criteria A must NOT be X, Y, or Z.

The Medical Coding Classifier System may additionally include a feature that automatically populates information relating to the provider to any applicable code reports based on the assigned head mounted display(s), patient(s), or web application login credentials used by that provider.

The Medical Coding Classifier System may utilize one or more ML/AI models, one or more points of platform data, and one or more other Platform features to determine if any usage of the XR platform qualifies as meeting the criteria for a code, or to determine if the criteria already met for a given code and patient have satisfied any needed requirements.

Outputs of the Medical Coding Classifier System and other platform data may be utilized to identify any unfulfilled criteria for one or more medical value code(s), and these identified unfulfilled criteria may be utilized in informing the configurations for one or more subsequent scenes, sessions, or regimens.

Specific outputs of the Medical Coding Classifier System may be searched and filtered for by providers, patients, or other individuals working within authorized settings such as within healthcare institutions. Reports may be searched for or filtered based on a patient's name or other related information, clinical dates of service, when criteria may have been completed, or by a particular code. The billing reports themselves may be generated based on a patient's name or other related information, clinical dates of service, when criteria may have been completed, by a particular code or they may be generated automatically.

An exemplary output report of the Medical Coding Classifier System shows all data collected for a series of one or more care episodes relating to remote physiologic monitoring for a particular patient. The output report is populated with a variety of different types of platform data produced through the application of one or more platform features.

A sample value code report is copied below.

Providers or other personnel may define session configurations by selecting various different sets of scenes and placing them within categories using the web application. These session categories may represent functional, disease related, organ system related, individual related, population related, or any other meaningful labels or classifications relating to health or wellness. Session categories may also represent the days of the week or other meaningful duration(s) of time during which a regimen of one or more scenes may be deployed for one or more patients. Scenes within each session category may be individually searched for and selected, and the order in which these scenes may appear or be deployed within the session can be configured using the web application. Similarly, the order in which the session categories may appear or be deployed within the session can also be configured using the web application.

Within the Medical Coding Classifier System, criteria may be organized, tagged, or labeled as falling into one or more groups or categories (criteria groups) using the web application.

Other Exemplary Embodiments

Variations of the exemplary XR platform disclosed herein may use one or more large language models or other ML/AI models to generate, modify, classify, configure, or constrain one or more inputs or outputs relating to one or more items of text, audio, images, video, or rendered . . . objects. For example, one or more large language models may be utilized alongside one or more other ML/AI models to identify a patient's feelings, emotions or cognitive distortions as part of an implementation delivering cognitive behavioral

| Value Code Reports | | | | | |
|---|---|---|---|---|---|
| Select Facility | | | | | |
| XR Healthcare Practice | | ˅ | | | |
| Generate Billing Report | | | | | |
| Show Filters | | | | | |
| Search and select a patient | | | | | |
| First Name | Last Name | | Search | (Filter by Billing Code | |
| - Select Patient - | | | ˅ | | |
| Criteria start Date | | | Criteria End Date | | |
| mm/dd/yyyy | mm/dd/yyyy | | mm/dd/yyyy | ▫ mm/dd/yyyy | |
| Min | Max | | Min | Max | |
| Billing Period Criteria | Non Billing Period Criteria | | | | |
| Completed | ˅ | | ˅ | | |
| | | Filter | | | |
| Patient Billing Code | Criteria Start Date | Billing Period Criteria End Date | Criteria Met | Non Billing Period Criteria Met | Report Cant Be Completed Completed | Finalized |
| Allen Test Duration summation Billing Code | May, 04 2023 | May, 05 2023 | true | true | false | true |
| Allen Test Duration summation Billing Code | May, 04 2023 | May, 05 2023 | false | true | false | false |
| 96127-Brief Emotional/ Behavioral Assessment | May, 02 2023 | May, 03 2023 | false | false | false | false |

New criteria can be built using a criterion building capability on the web application. This capability allows providers or other personnel within healthcare related institutions to define, name, and describe existing or novel criteria relating to one or more meaningful efforts or metrics. For criteria built using data from direct patient to provider communications or interactions, users may select one or more modalities from voice, video, or extended reality to determine which types of communications or interactions apply.

therapy within XR. Variations may also use one or more large language models or other ML/AI models to generate, modify, classify, configure, or constrain one or more configurable elements relating to these inputs or outputs. For example, one or more large language models may be utilized alongside one or more other ML/AI models to inform the configuration of a text generation model to produce a more optimal text output that will be subsequently displayed to a patient in XR as part of a mental health-related implementation.

Variations of the XR platform may utilize one or more large language models or other ML/AI models to generate, modify, classify, configure, or constrain one or more configurable elements relating to one or more scenes, sessions, or regimens.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112 (f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A computer-implemented XR platform adapted for electronically rendering user sessions within an XR environment comprising immersive scenes applicable for at least one of teaching, training, instructing, diagnostic, therapeutic and care delivery, said XR platform comprising:
    a plurality of software modules;
    a combined extended reality display and computing device for being employed by a user during a user session and adapted for implementing one or more of said plurality of software modules; and
    a classifier system for automatically identifying, classifying, and documenting XR usage data captured by said combined extended reality display and computing device, and comprising criteria adapted to fulfill a requirement for at least one billing code relating to the user session; and
    at least one of a camera communicating with said combined extended reality display and computing device, a speaker communicating with said combined extended reality display and computing device and adapted for enabling audio communication to a user, and a microphone communicating with said combined extended reality display and computing device and adapted for enabling audio communication by a user.

* * * * *